(12) United States Patent
Visentin et al.

(10) Patent No.: US 10,495,460 B2
(45) Date of Patent: Dec. 3, 2019

(54) DETECTION SYSTEM AND METHOD TO CHECK THE POSITION OF A PIPELINE IN A BED OF A BODY OF WATER

(71) Applicant: SAIPEM S.p.A., San Donato Milanese (IT)

(72) Inventors: Roberto Visentin, Mestre (IT); Paolo Bonel, Venice (IT); Fabio Chiappa, Milan (IT); Giancarlo Bernasconi, Malnate (IT)

(73) Assignee: SAIPEM S.p.A., San Donato Milanese (IT)

( * ) Notice: Subject to any disclaimer, the term of this patent is extended or adjusted under 35 U.S.C. 154(b) by 134 days.

(21) Appl. No.: 15/556,447

(22) PCT Filed: Mar. 9, 2016

(86) PCT No.: PCT/IB2016/051342
§ 371 (c)(1),
(2) Date: Sep. 7, 2017

(87) PCT Pub. No.: WO2016/142885
PCT Pub. Date: Sep. 15, 2016

(65) Prior Publication Data
US 2018/0106614 A1     Apr. 19, 2018

(30) Foreign Application Priority Data
Mar. 9, 2015   (IT) .............................. MI2015A0354

(51) Int. Cl.
*G01C 13/00*     (2006.01)
*G01C 5/00*      (2006.01)
(Continued)

(52) U.S. Cl.
CPC ............. *G01C 13/008* (2013.01); *G01C 5/00* (2013.01); *G01C 13/00* (2013.01); *G01S 7/521* (2013.01);
(Continued)

(58) Field of Classification Search
CPC ........ G01C 13/008; G01C 13/00; G01C 5/00; G01S 7/52003; G01S 7/521; G01S 7/539;
(Continued)

(56) References Cited

U.S. PATENT DOCUMENTS 4,247,923 A * 1/1981 De Kok ................ G01S 7/6263
                                                              367/110
5,537,366 A    7/1996 Gilmour
(Continued)

OTHER PUBLICATIONS

Notification Concerning Submission, Obtention or Transmittal of Priority Document for International Application No. PCT/IB2016/051342 dated May 13, 2016.
(Continued)

*Primary Examiner* — Bryan Bui
(74) *Attorney, Agent, or Firm* — Neal, Gerber & Eisenberg LLP

(57) ABSTRACT

A detection system to check the position of a pipeline in a bed of a body of water and extending along a predetermined route; the system comprising a device, which is configured to be moved in a moving direction and along the predetermined route and comprises a support, which mainly extends transversely to the moving direction, a quantity of acoustic wave sources, which are mounted on the support and are configured to transmit acoustic waves through the body of water and the bed of the body of water, and a quantity of acoustic wave receivers, which are located along the support and are configured to receive reflected acoustic waves and emit reception signals related to the reflected acoustic waves; and a processing unit comprising an acquisition unit, (Continued)

which is configured to receive, from the outside, at least one datum selected within a group of known or expected data comprising: the known value of the cross-section of the pipeline, an expected value of the trenching height of the pipeline, the known shape of the pipeline, the expected bathymetric profile of the bed of the body of water, and an expected value of the position of the pipeline; the processing unit being configured to calculate a parameter related to the position of the pipeline in the bed of the body of water on the basis of the reception signals and of said at least one datum selected within the group of data.

35 Claims, 4 Drawing Sheets

(51) Int. Cl.
| | | |
|---|---|---|
| | *G01S 7/52* | (2006.01) |
| | *G01S 7/521* | (2006.01) |
| | *G01S 7/539* | (2006.01) |
| | *G01S 15/10* | (2006.01) |
| | *G01S 15/87* | (2006.01) |
| | *G01S 15/88* | (2006.01) |
| | *G01S 15/89* | (2006.01) |
| | *G01V 1/38* | (2006.01) |
| | *F16L 1/11* | (2006.01) |
| | *F16L 1/12* | (2006.01) |
| | *F16L 1/20* | (2006.01) |

(52) U.S. Cl.
CPC .......... *G01S 7/52003* (2013.01); *G01S 7/539* (2013.01); *G01S 15/104* (2013.01); *G01S 15/876* (2013.01); *G01S 15/88* (2013.01); *G01S 15/89* (2013.01); *F16L 1/11* (2013.01); *F16L 1/12* (2013.01); *F16L 1/20* (2013.01); *G01V 1/38* (2013.01)

(58) Field of Classification Search
CPC ...... G01S 15/104; G01S 15/876; G01S 15/88; G01S 15/89
See application file for complete search history.

(56) References Cited

U.S. PATENT DOCUMENTS

2014/0165898 A1  6/2014  Cierpka et al.
2016/0252422 A1* 9/2016  Howitt .................. E03B 7/071
                                                    73/40.5 A

OTHER PUBLICATIONS

International Search Report and Written Opinion for International Application No. PCT/IB2016/051342 dated Jun. 23, 2016.
PCT Demand for International Preliminary Examination and Reply to International Search Report and the associated Written Opinion for International Application No. PCT/IB2016/051342 dated Jan. 9, 2017.
Notification of Receipt of Demand by Competent International Preliminary Examining Authority (Form PCT/IPEA/402) for International Application No. PCT/IB2016/051342 dated Jan. 16, 2017.
Second Written Opinion for International Application No. PCT/IB2016/051342 dated Mar. 13, 2017.
Reply to the Second Written Opinion for International Application No. PCT/IB2016/051342 dated Apr. 13, 2017.
Notification of Transmittal of the International Preliminary Report on Patentability (Form PCT/IPEA/416) for International Application No. International Application No. PCT/IB2016/051342 dated Sep. 5, 2017.
Y. R. Petillot et al: "Real Time AUV Pipeline Detection and Tracking Using Side Scan Sonar and Multi-Beam Echosounder", Oceans System Laboratory, Heriot Watt University School of EPS, vol. 1, pp. 217-222, Oct. 29, 2002.

* cited by examiner

DETECTION SYSTEM AND METHOD TO CHECK THE POSITION OF A PIPELINE IN A BED OF A BODY OF WATER

PRIORITY CLAIM

This application is a national stage application of PCT/IB2016/051342, filed on Mar. 9, 2016, which claims the benefit of and priority to Italian Patent Application No. MI2015A000354, filed on Mar. 9, 2015, the entire contents of which are each incorporated by reference herein.

TECHNICAL FIELD

The present disclosure relates to a detection system and method to check the position of a pipeline in a bed of a body of water.

BACKGROUND

Generally, an underwater pipeline is laid in the bed of the body of water and buried in the bed of the body of water at a certain depth, in particular at landings and in shallow water to protect the pipeline from external agents. Once the pipeline has been buried, it is necessary to check if the position of the pipeline in the bed of the body of water falls within the design values. Another parameter to check is the trenching height, which by convention is the distance between the upper end of the pipeline and the upper end of the bed of the body of water.

U.S. Pat. No. 5,537,366 discloses a sonar system, which is able to detect cable and pipelines buried under the bottom of the body of water while distinguishing them from a rock stratum.

Y R Petilot Et Al.: "Real time AUV pipeline detection and tracking using side scan sonar and multi-beam Echo-sounder", Ocean'02 MTS, vol. 1 (ISBN: 0780375343) discloses a technique for reliably detecting and tracking pipelines using multi-beam echo-sounder and side-scan sonar system.

U.S. Published Patent Application No. 20140165898 discloses an unmanned underwater vehicle for localizing and examining an object arranged at the bottom of a body of a water.

SUMMARY

One advantage of the present disclosure is to provide a detection system to check the position of a pipeline in a bed of a body of water that is simple and inexpensive.

According to the present disclosure, a detection system is provided to check the position of a pipeline in a bed of a body of water and extending along a predetermined route; the system comprising a device configured to be moved in a moving direction and along the predetermined route in the body of water, and comprising a support, which mainly extends transversely to the moving direction, a quantity or number of acoustic wave sources mounted on the support, configured to transmit acoustic waves through the body of water and the bed of the body of water, and a quantity or number of acoustic wave receivers located along the support and configured to receive reflected acoustic waves and emit reception signals related to the reflected acoustic waves; and a processing unit comprising an acquisition unit configured to receive, from the outside, at least one datum selected within a group of known or expected data comprising: the known value of the cross-section of the pipeline, an expected value of the trenching height of the pipeline, the known shape of the pipeline, the expected bathymetric profile of the bed of the body of water, and an expected value of the position of the pipeline; the processing unit being configured to calculate a parameter related to the position of the pipeline in the bed of the body of water on the basis of the reception signals and of said at least one datum selected within the group of data, and to check if the parameter falls within certain ranges; wherein the quantity of receivers is equal to or greater than two; in particular the quantity of receivers is equal to or greater than three; wherein the receivers are distributed transversely to the moving direction; and comprising a mechanism to adjust the immersion depth of the support in the body of water, so as to place the support at a designated or given estimated distance from the pipeline.

With the present disclosure, by using the at least one datum selected within the data group, the processing unit is able to calculate the parameter related to the position of the pipeline in real time due to the reduction in complexity of the calculation. In this way, the detection system checks if the position of the pipeline in the bed of the body of water respects the assigned design values.

According to certain embodiments of the present disclosure, the processing unit comprises an output interface to correct the moving direction on the basis of the parameter calculated in the previous instant.

With the present disclosure, the system reduces the detection time because the system follows the pipeline using the parameter calculated in real time.

According to another embodiment, the processing unit is configured to calculate the path of the acoustic waves reflected by the pipeline through the body of water and the bed of the body of water on the basis of the reception signals; and to calculate the parameter related to the position of the pipeline on the basis of the calculated path of the acoustic waves.

With the present disclosure, the system keeps the distance between the pipeline and the support almost constant, in this way optimizing detection of the parameter and extending the surface covered.

According to another embodiment, each source of said quantity of sources is configured to emit the acoustic wave with a frequency linearly variable with time within a designated or given frequency range, which depends on the desired space resolution and on the desired penetration depth. In this way, the acoustic beams have a broad range and a large penetration capability.

According to another embodiment of the present disclosure, the quantity or number of sources is equal to or greater than two, in particular the quantity of sources is equal to three; one of the three sources being located at the center of the support and the other two sources being located at the ends of the support.

It should be appreciated that based on the sensors located at the ends of the support, the device covers a broader surface and enables striking the pipeline with acoustic waves coming from different angles. In this way, the system obtains a better estimate of the parameter.

According to another embodiment of the present disclosure, the quantity or number of receivers has a transduction gain from the sound to the reception signal that is substantially independent of the direction of provenance of the sound.

With the present disclosure, the detection device covers a broad surface and, in consequence, requires a smaller quantity or number of passes over the pipeline.

With the present disclosure, the system enables reducing the passes over the pipeline by reducing the time for calculating the position of the pipeline.

With the present disclosure, the system receives the reflected acoustic waves from different receivers. In this way, the system receives acoustic waves that have taken different paths and calculates the parameter with high precision.

The device with a quantity or number of receivers greater than or equal to three has the advantage of estimating the parameter more precisely and of having fewer constraints on the minimum distance between the receivers. In fact, the reflected acoustic waves align themselves along a hyperbolic path in the space-time domain and, in consequence, the device with a quantity of receivers equal to or greater than three can reconstruct the hyperbolic path of the reflected waves based on the readings of the three receivers, as a hyperbola is unambiguously defined by three points. In addition, with the present disclosure, the detection device with a minimum quantity of three receivers reduces problems of spatial aliasing.

According to another embodiment, the quantity or number of sources and the quantity of receivers are placed so as to form an upside-down V with the concave part facing the bed of the body of water; in particular, the V forming an angle lying within the range having limits of 80° and 100°. In certain such embodiments, the quantity of sources is greater than or equal to two, and the quantity of receivers is greater than or equal to three.

With the present disclosure, the detection device extends the radius of coverage of the detected surface with a smaller length or a smaller immersion depth for a designated or given detected surface.

According to another embodiment, the processing unit is configured to calculate the speed of sound through the bed of the body of water from the reception signals and so reduces measurement errors regardless of the use of any standard speed tables.

Furthermore, the quantity of receivers has a transduction gain from the sound to the reception signal that is substantially independent of the direction of provenance of the sound.

With the present disclosure, the device enables calculating the parameter related to the position of the pipeline without knowing the exact position of the pipeline, but knowing the probable position. Furthermore, the device has a radius of coverage with a wide angle that enables detecting the parameter in just one pass, without the need to perform criss-cross passes over the pipeline. In addition, the processing unit is configured to perform statistical autocorrelation between the reception signals to compensate for directional power losses due to the wide angle of the illumination beam.

In addition, the processing unit is connected to the source to control transmission signals for the emission of the acoustic waves and is configured to calculate the parameter related to the position of the pipeline in the bed of the body of water on the basis of the transmission signals, such as on the basis of a statistical correlation between the transmission signals and the reception signals. In this way, the device provides the position of the pipeline with high precision.

Another advantage of the present disclosure is to provide a method for detecting the position of a pipeline in the bed of a body of water that is simple and inexpensive.

According to the present disclosure, a detection method is provided to check the position of a pipeline in a bed of a body of water extending along a predetermined route; the method comprising the steps of moving, in a moving direction and along the predetermined route in the body of water, a quantity of acoustic wave sources and a quantity of acoustic wave receivers distributed transversely to the moving direction; transmitting acoustic waves through the body of water and the bed of the body of water by the quantity of acoustic wave sources; receiving the acoustic waves reflected by the pipeline by the quantity of acoustic wave receivers; acquiring, from the outside, at least one datum selected within a group of known or expected data comprising: the known value of the cross-section of the pipeline, an expected value of the position of the pipeline, the shape of the pipeline, the bathymetric profile of the bed of the body of water, and an expected value of the position of the pipeline; and calculating a parameter related to the position of the pipeline in the bed of the body of water on the basis of the reflected acoustic waves received and on the basis of said at least one datum selected within the group of data; and checking if the parameter falls within certain ranges; wherein the quantity of receivers is equal to or greater than two; in particular the quantity of receivers is equal to or greater than three; and comprising the step of immersing the quantity of sources and the quantity of receivers in such a way that they are at a designated or given estimated distance from the pipeline.

Additional features and advantages are described in, and will be apparent from the following Detailed Description and the figures.

BRIEF DESCRIPTION OF THE DRAWINGS

Further characteristics and advantages of the present disclosure will become clear from the description that follow of a non-limitative embodying example, with reference to the figures of the accompanying drawings, in which.

DETAILED DESCRIPTION

Figure 1:
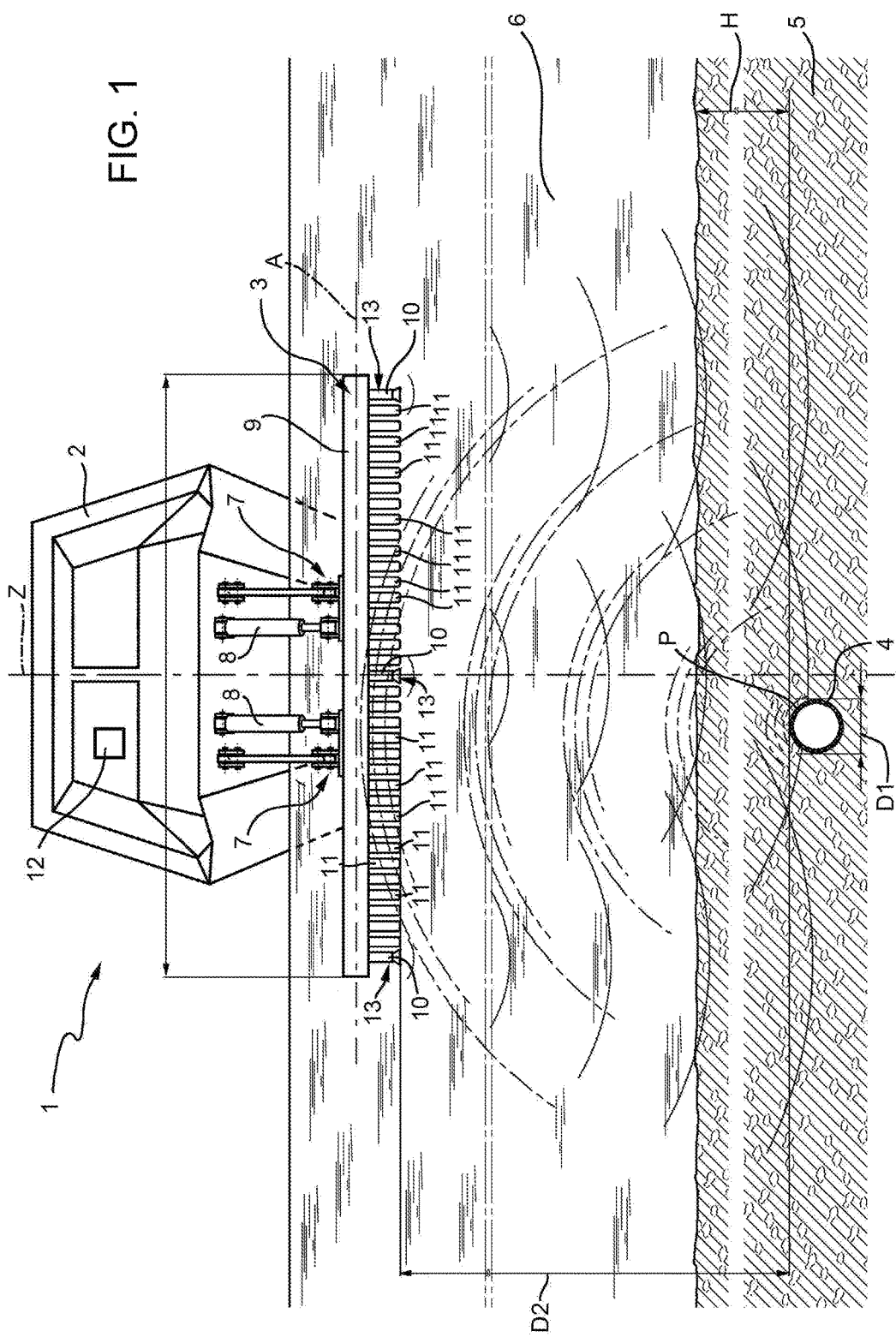
FIG. 1 is a rear elevation view, with parts removed for clarity, of a detection system of the position of a pipeline in the bed of a body of water, and with parts in section of the pipeline, of a body of water and of a bed of a body of water.
Figure 2:
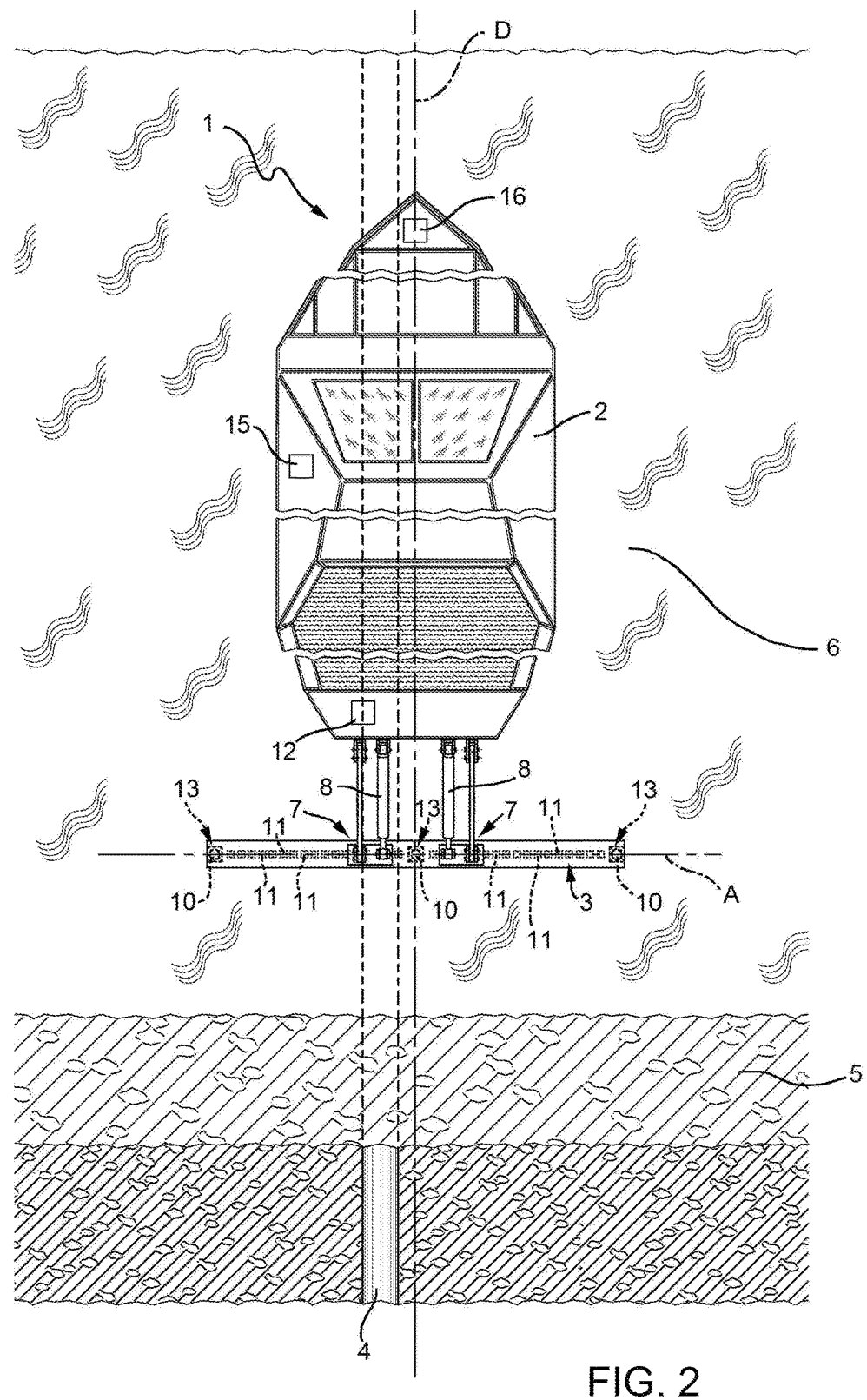
FIG. 2 is a plan view, with parts removed for clarity, of FIG. 1.
Figure 3:
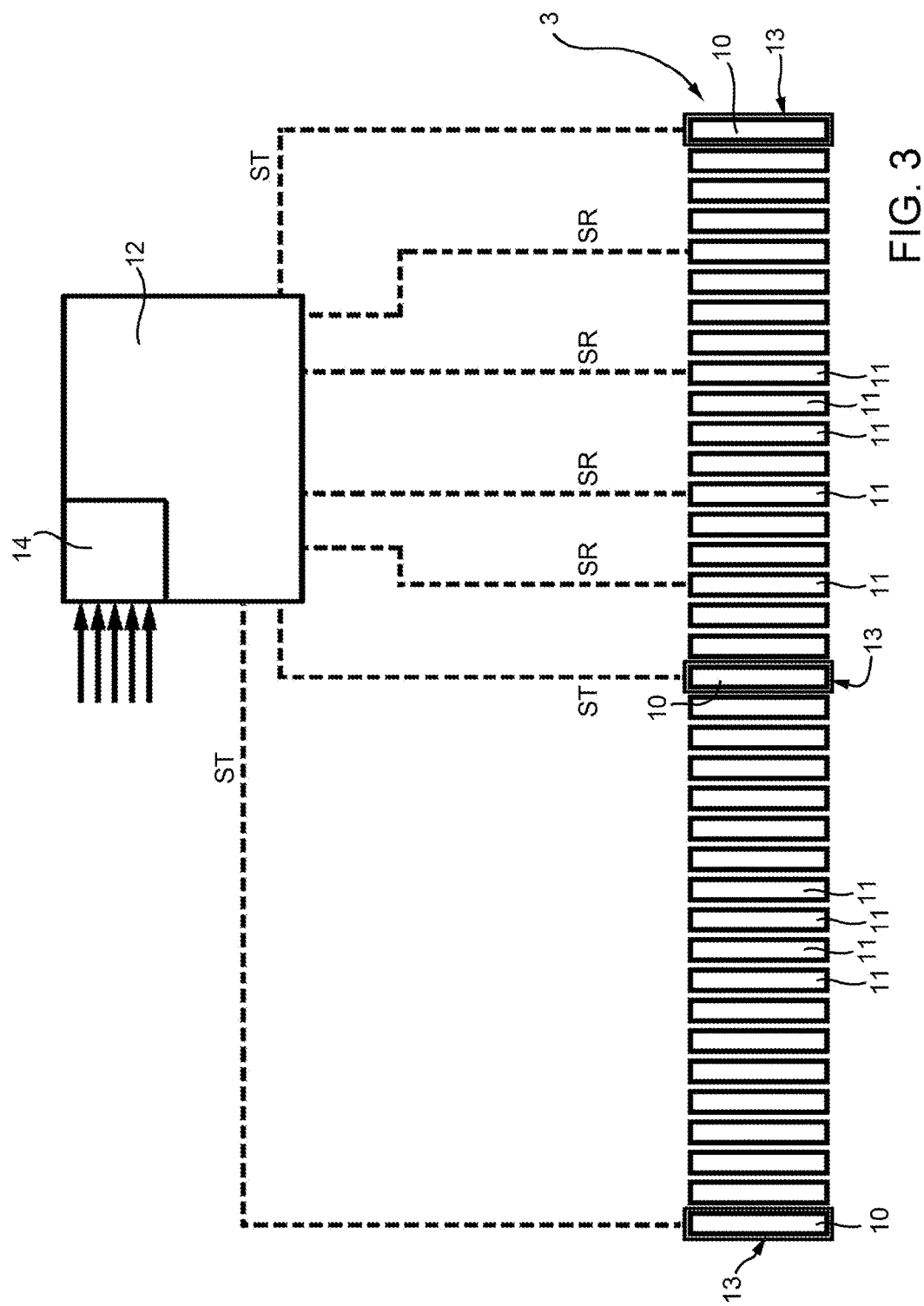
FIG. 3 is a block diagram of a detection device of the detection system.

Referring now to the example embodiments of the present disclosure illustrated in FIGS. 1 to 4, referring to FIGS. 1 and 2, reference numeral 1 indicates, as a whole, a detection system 1 configured to check the position of a pipeline 4 in the bed 5 of a body of water 6 and comprising a vessel 2 and a detection device 3. In use, the vessel 2 is configured to proceed in a moving direction D. The device 3 comprises a connection system 7 to connect device 3 to the vessel 2 and be moved in the body of water 6. In particular, the connection system 7 comprises actuators 8 that enable adjusting the immersion depth of the support 9 in the body of water 6 so as to place the support 9 at an estimated distance D2 from the pipeline 4.

The device 3 comprises a support 9 that mainly extends along an axis A that, in use, is transversal to the moving direction D. In other words, the support 9 extends mainly along axis A; in particular, the size of the support 9 along the axis A is at least twice the size transversal to the axis A of the support 9. In particular, the size of the support 9 along the axis A is at least ten times its size transversal to the axis A.

The device 3 comprises a quantity or number of acoustic wave sources 10 distributed along the support 9 and a quantity or number of acoustic wave receivers 11 distributed along the support 9.

The system 1 comprises a processing unit 12 in communication with the quantity of acoustic wave sources 10 and the quantity of acoustic wave receivers 11.

Each acoustic wave source 10 is configured to transmit an acoustic wave through the body of water 6 and the bed 5 of the body of water 6, and is, in certain embodiments, spaced apart from the adjacent sources 10 so that the acoustic waves emitted by the sources 10 pass through the body of water 6 and the bed 5 of the body of water 6 with mutually different angles. In particular, the quantity of sources 10 is constituted by three acoustic wave sources 10 spaced apart from each other along the support 9. In greater detail, one of the three acoustic wave sources 10 is located at the center of the support 9 and the other two acoustic wave sources 10 are located at the ends of the support 9. This configuration enables emitting acoustic waves that pass through the body of water 6 and the bed 5 of the body of water 6 from different angles according to the position of each source 10. Each source 10 comprises a transducer 13 that in turn comprises a quantity of piezoelectric elements.

The piezoelectric elements are aligned along an axis that can be parallel to axis A or perpendicular to axis A and are configured so as to be powered individually or in groups. In one non-limitative embodiment of the present disclosure, the piezoelectric elements are powered in sequence starting from one of them, for example the central one, and then proceeding symmetrically outwards. In another non-limitative embodiment of the present disclosure, the piezoelectric elements are all powered together in the same manner, so as to increase the directivity of the emitted acoustic wave. In this way, the piezoelectric elements generate CHIRP type acoustic waves having a broad frequency spectrum that ensures a high penetration capability and wide spatial coverage. In addition, a better signal-to-noise ratio is obtained by using CHIRP acoustic waves. Each source 10 of the three sources 10 is therefore configured so as to be omnidirectional along a hemisphere facing the bed 5 of the body of water 6. In other words, each emitted acoustic wave expands following a hemisphere facing the bed 5 of the body of water 6. In certain non-limitative embodiments of the present disclosure, each source 10 comprises five piezoelectric elements. The transducer 13 comprises a power supply unit for the five piezoelectric elements that is configured to power just one, three of the five, or all five, starting from the central one and proceeding symmetrically outwards. In greater detail, each acoustic wave source 10 is configured to emit an acoustic wave with a cyclical frequency linearly variable with time, the frequency range depending on the desired space resolution and, in certain embodiments, on the cross-section D1 of the pipeline 4, and on the desired penetration depth in the bed 5 of the body of water 6. By way of example, each source 10 is configured to emit a CHIRP type acoustic wave with a duration of between 2 and 6 ms, such as 4 ms, and which varies linearly with time in the 1 to 60 kHz frequency range, such as in the 10 to 50 kHz frequency range. The frequency range is chosen on the basis of the desired resolution and the desired penetration. In one such embodiment, the desired resolution is in the order of a centimetre.

In an alternative embodiment of the present disclosure, each source 10 comprises magnetodynamic or magnetostrictive transducers.

The quantity of acoustic wave receivers 11 is constituted by a number N of acoustic wave receivers 11 aligned along axis A. The number N is variable, depending on the desired resolution. In one embodiment, the number N is equal to one.

In another embodiment, the number N is equal to three. The detection device 3, with a number N of receivers 11 grater or equal to three, has the advantage of estimating the position of the pipeline 4 more precisely and of having fewer constraints on the minimum distance between the receivers 11. In these embodiments, the acoustic waves reflected by the pipeline 4 align along a hyperbolic path in the space-time domain and, in consequence, the detection device 3, by having a number of receivers 11 equal to or greater than three, can properly reconstruct the hyperbolic path of the reflected waves based on the readings of the three receivers 11, because a hyperbola is unambiguously defined by three points. In this way, the device 3 reduces problems of spatial aliasing.

In yet another embodiment, the number N is in the order of tens of receivers 11. The plurality of receivers 11 are arranged such that there is at least one receiver 11 between two sources 10. Furthermore, when the receivers 11 are in the order of tens, the receivers 11 are uniformly distributed with a constant distribution distance; in particular, the distribution distance is smaller than or equal to 40 cm, such as smaller than or equal to 20 cm. The plurality of receivers 11 extends along axis A for a designated or given length L ranging from 3 to 5 metres, in particular 4 metres. In certain embodiments, the length L is related to the distance between the support 9 and the pipeline 4.

By way of example, each receiver 11 is a hydrophone of high sensitivity and having a receiving frequency response that is almost flat from approximately 0.1 to 180 kHz and, in particular, deviations from the mean gain value are negligible up to 15 kHz. Furthermore, by way of example, each receiver 11 has a reception diagram, measured at a frequency of 100 kHz, which develops along a circumference of the plane formed by the axes parallel to axis A and to the moving direction D and along a line, which is inside an annulus having a width of 5-10 dB, in the plane formed by the axes parallel to the A and Z axes, where Z is an axis perpendicular to axis A, to the moving direction D and transversal to the bed 5. In consequence, each receiver 11 has a reception gain substantially the same from whatever direction in space the sound arrives. In other words, each receiver 11 has a transduction gain from the sound to the reception signal SR that is substantially independent of the direction of provenance of the sound.

Therefore, each acoustic wave receiver 11 is configured to receive acoustic waves reflected at different angles and emit reception signals SR, which are related to the reflected acoustic waves and are transmitted to the processing unit 12.

The receivers 11 identify a detection half-plane that extends from the support 9 towards the bed 5 of the body of water 6 and transversely thereto; in particular, the detection plane is perpendicular to the bed 5 of the body of water 6 and the half-plane comprises axis A and axis Z.

According to an alternative embodiment of the present disclosure, each transducer 13 is configured to work both as a source 10 and as an acoustic wave receiver. According to this embodiment, the device 3 thus comprises a row of receivers 11 and transducers 13, which are aligned along axis A and distributed with a constant distribution distance and are all configured to generate a reception signal SR.

The device 3 adjusts, via the actuators 8, the distance D2 of the support 9 from the upper end of the pipeline 4 measured along axis Z. The distance D2 is adjusted so as to be within a designated or given range the limits of which are respectively given by: a) the length L; and b) twice the length L; such as at an estimated distance D2 equal to the product of 1.5 times the length L.

Figure 4:
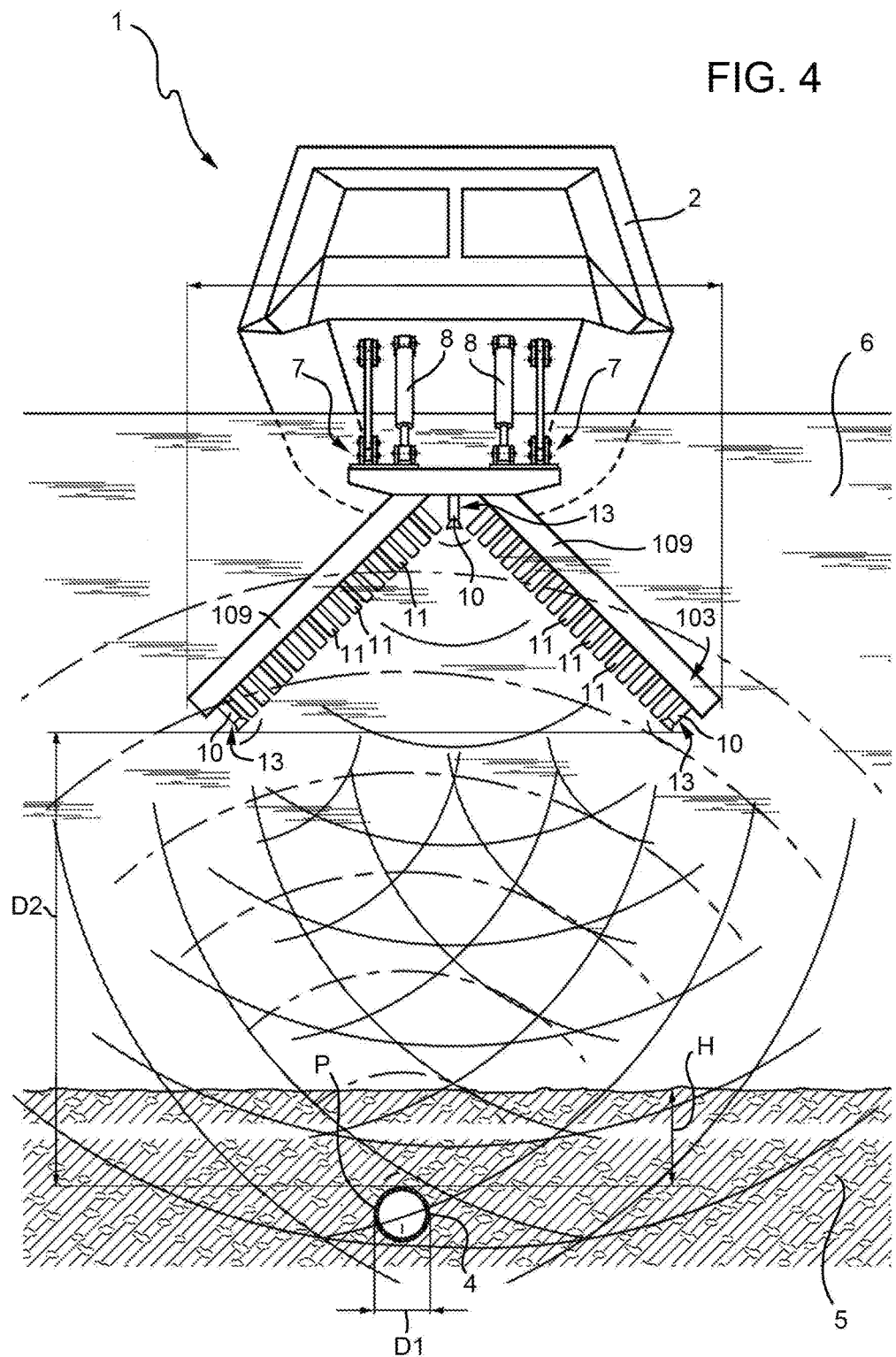
FIG. 4 is a rear elevation view, with parts removed for clarity, of an alternative embodiment of the detection system of FIG. 1.

In an alternative embodiment shown in FIG. 4, the device 103 comprises an upside-down V shaped support 109. Furthermore, the device 103 comprises a plurality of sources 10 and receivers 11 located along the support 109 so as to form an upside-down V, with the concave part facing the bed 5 of the body of water 6. In particular, the support 109 forms an angle in the range between 80° and 100°. In the embodiment shown, the angle is 90°. With the present embodiment, the device 103 needs a smaller immersion depth for a designated or given length L and can detect the pipeline 4 at a greater distance D2 from the pipeline 4 with respect to device 3.

The processing unit 12 is in communication with the acoustic wave sources 10 to control the transmission signals ST and with the acoustic wave receivers 11 to receive the reception signals SR. In addition, the processing unit 12 knows the positions of the sources 10 and associates a datum related to the position of the respective source 10 with each transmission signal ST. In a similar manner, the processing unit 12 knows the positions of the receivers 11 and associates a datum related to the position of the respective receiver 11 with each reception signal SR.

According to an alternative embodiment, the transmission signals ST are generated by the acoustic wave sources 10 or by another device associated with the acoustic wave sources 10 and are also sent to the processing unit 12.

The processing unit 12 is configured to check if a parameter related to the position of the pipeline 4 in the bed 5 of the body of water 6 falls within certain ranges. In other words, the pipeline 4 has been buried in the bed 5 of the body of water 6 at a designated or given depth and in a designated or given position that are known from the design values and more or less correspond to the effective data except for important deviations in the execution phase. The processing unit 12 is configured to calculate the position of the pipeline 4 and the parameters related to the burying by using all the information known beforehand so as to check if the burying has been correctly performed.

In particular, the processing unit 12 calculates the position of the pipeline 4 and the parameters related to the burying of the pipeline 4 in the bed 5 of the body of water 6 on the basis of the reception signals SR. In an alternative embodiment of the present disclosure, the processing unit 12 calculates the position of the pipeline 4 in the bed 5 of the body of water 6 on the basis of the reception signals SR and the transmission signals ST.

In addition, the processing unit 12 is configured to calculate four other parameters based on the calculated position of the pipeline 4: a first parameter, a second parameter, a third parameter and a fourth parameter.

The first parameter is the value of the trenching height H of the upper end of the pipeline 4 in the bed 5 of the body of water 6. In other words, the "trenching height H" means the distance between the surface of the bed 5 of the body of water 6 and the upper end of the pipeline 4. By way of example, the desired value of the first parameter, namely the trenching height H, is within a first range between 2.5 and 3 metres.

The second parameter is the value of the straightness of the pipeline 4 along axis Z, in other words the maximum vertical excursion of the pipeline 4 along a predetermined length. By way of example, the desired value of the second parameter is an excursion smaller than 20 cm along axis Z over a length of 25 metres of pipeline 4.

The third parameter is related to the shape of the trench in which the pipeline 4 is laid.

The fourth parameter is the value of the thickness of the covering of the pipeline 4, (i.e., the amount of covering material on top of the pipeline 4).

In addition, the processing unit 12 comprises an acquisition unit 14 configured to receive, from the outside, for example from an operator or from another device connected to device 3, a value of the speed of sound in the body of water 6 and set this value in the processing unit 12. According to an alternative embodiment of the present disclosure, the processing unit 12 calculates the speed of sound in the body of water 6 from the reception signals, in particular the processing unit 12 detects the speed of sound in the bed 5 of the body of water 6 from reception signals originated by acoustic waves that propagate directly from the transmitter 10 to the receiver 11 without being reflected.

The acquisition unit 14 is also configured to receive, from the outside, a value of the cross-section D1 of the pipeline 4 to look for and to set this value in the processing unit 12.

The acquisition unit 14 is also configured to receive, from the outside, a value related to a probable trenching height H of the pipeline 4 to look for and to set this value in the processing unit 12.

In certain non-limitative embodiments of the present disclosure, the acquisition unit 14 receives the coordinates of the direction of navigation followed.

In addition, the acquisition unit 14 is configured to store the bathymetric profile of the bed 5 of the body of water 6. In greater detail, the bed 5 of the body of water 6 is analysed along the laying path of the pipeline 4 by a bathometer 16 and the collected data is stored in the acquisition unit 14. The acquisition unit 14 transfers this data to the processing unit 12. According to an alternative embodiment of the present disclosure, the acquisition unit 14 receives the bathymetric profile in real time from a multibeam sonar. According to an alternative embodiment of the present disclosure, the processing unit 12 calculates the bathymetric profile from the reception signals SR; in particular, the processing unit 12 calculates the bathymetric profile on the basis of the acoustic waves reflected by the bed 5 of the body of water 6.

The processing unit 12 is configured to detect the parameters of a cylindrical pipeline 4. In other words, the processing unit 12 is configured with a model that describes the pipeline 4 as cylindrical and takes into account the effects of the reflection of the acoustic waves on a cylindrical pipeline 4. In this way, the shape of the pipeline 4 to look for is not an unknown, but defines known values and, in consequence, reduces the computational complexity of the system to be solved.

The acquisition unit 14 is configured to receive, from the outside, a value or a range of values that indicate the expected position of the pipeline 4. In other words, after the laying of the pipeline 4, a range of position values can be defined within which the pipeline 4 will be present.

The processing unit 12 uses the above-identified data to calculate the position P of the pipeline 4; in particular, the processing unit 12 calculates the position P of the upper end of the pipeline 4.

The processing unit 12 uses the calculated position P of the pipeline 4 to calculate the first parameter (i.e., the value of the trenching height H).

The processing unit 12 uses the calculated position P of the pipeline 4 to calculate the second, third and fourth parameters.

In certain non-limitative embodiments of the present disclosure, the processing unit 12 calculates the second, third and the fourth parameter on the basis of the values of the first parameter.

In greater detail, the processing unit 12 receives the reception signals SR and calculates the path that the acoustic waves have taken when moving in the body of water 6 and in the bed 5 of the body of water 6 on the basis of ray tracing theory and one or more of the following data items: the set or calculated speed of sound in the body of water 6, the profile of the bed 5 of the body of water 6, an expected value for the position of the pipeline 4, the set shape of the pipeline 4, the known value of the cross-section D1 of the pipeline 4, the position of the sources 10 and of the receivers 11 along the support 9, an expected value for the trenching height H, and the coordinates of the direction of navigation followed. From this analysis, the processing unit 12 calculates path curves that represent the paths taken by the acoustic waves reflected by the pipeline 4 and by the bed 5 of the body of water 6.

The processing unit 12 calculates the speed of sound in the bed 5 of the body of water 6 from the reception signals SR and calculates the position P of the pipeline 4 on the basis of the calculated speed of sound in the bed 5 of the body of water 6 and the calculated path curves. In greater detail, the processing unit 12 calculates the values related to the position of the upper end of the pipeline 4, in particular to the position along axis A and axis Z of the upper end of the pipeline 4, and the speed of sound in the bed 5 of the body of water 6 via a semblance functional averaged over the number of the plurality of receivers 11. The semblance functional is an integral in phase in Gaussian windows of the reception signals SR along the calculated path curves. The processing unit 12 calculates the mean statistical value and standard deviation of the results of the semblance functional averaged over the number of receivers 11, and defines the position P of the pipeline 4 and the speed of sound in the bed 5 of the body of water 6. In addition, the processing unit 12 calculates the first parameter (i.e., the trenching height H), on the basis of the position P of the pipeline 4.

It should be appreciated that based on the reception signals SR deriving from different sources 10 that originated reflected acoustic waves from mutually different angles, it is possible to determine the speed of sound in the bed 5 of the body of water 6 using ray theory.

According to an alternative embodiment of the present disclosure, the processing unit 12 calculates the speed of sound in the bed 5 of the body of water 6 with a statistical autocorrelation or a convolution integral of the reception signals SR coming from the various receivers 11 that detect the acoustic waves striking the pipeline 4 with different angles. The processing unit 12 then calculates the position P of the pipeline 4 on the basis of the calculated speed of sound in the bed 5 of the body of water 6 and the calculated path curves.

According to certain non-limitative embodiments of the present disclosure, the processing unit 12 is connected to the sources 10 to control the transmission signals ST that define the transmitted acoustic waves. The processing unit 12 uses the transmission signals ST as trigger signals to acquire the reception signals SR. Furthermore, in an alternative embodiment of the present disclosure, the processing unit 12 integrates the above-described process by using a statistical correlation between the transmission signals ST and the reception signals SR so as to increase measurement resolution and lower the uncertainties.

The processing unit 12 comprises an output interface 15 configured to define the moving direction D on the basis of the presumed dislocation of the pipeline 4. The output interface 15 is configured to correct the moving direction D on the basis of the position P of the pipeline 4 calculated in the previous instant by the processing unit 12.

In one embodiment of the present disclosure, the processing unit 12 calculates the propagation speed of the acoustic waves in the body of water 6 on the basis of the reception signals related to the unreflected acoustic waves; calculates the bathymetric profile of the bed 5 of the body of water 6 from the reception signals SR or receives said bathymetric profile from the outside by the acquisition device 14; calculates the propagation speed of the acoustic waves in the bed 5 of the body of water 6 from the reception signals SR related to the reflected acoustic waves; calculates the position P of the pipeline 4; checks if the position P of the pipeline 4 falls within the assigned design values; and calculates the corrections for the moving direction D on the basis of the detected position P.

It is evident that the system and the method forming the subject of the present disclosure are suitable for calculating the position of a pipeline lying in an uncovered trench. In this case, the trenching height H is defined as the distance between the surface of the bed 5 of the body of water 6 at the edges of the trench and the upper end of the pipeline 4.

Finally, it is evident that variants can be introduced regarding the present disclosure with respect to the described embodiments without departing from the scope of the appended claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A pipeline detection system comprising:
   a device configured to be moved in a moving direction and along a route in a body of water, said device including:
   a support extending transversely to the moving direction,
   a quantity of acoustic wave sources mounted on the support and configured to transmit acoustic waves through the body of water and a bed of the body of water,
   a quantity of at least three acoustic wave receivers located along the support and configured to receive reflected acoustic waves and emit reception signals related to the reflected acoustic waves, wherein the acoustic wave receivers are distributed transversely to the moving direction, and
   a mechanism configured to adjust an immersion depth of the support in the body of water to place the support at a designated estimated distance from a pipeline; and
   a processing unit including an acquisition unit configured to receive at least one datum selected from the group consisting of: a known value of a cross-section of the pipeline, an expected value of a trenching height of the pipeline, a known shape of the pipeline, an expected bathymetric profile of the bed of the body of water, and an expected value of a position of the pipeline, wherein the processing unit is configured to:
- calculate a parameter related to the position of the pipeline in the bed of the body of water based on the emitted reception signals and the at least one received datum, and
- check if the calculated parameter related to the position of the pipeline in the bed of the body of water falls within a designated range of parameters related to the position of the pipeline in the bed of the body of water.

2. The pipeline detection system of claim 1, wherein the processing unit comprises an output interface configured to change the moving direction based on a previously calculated parameter.

3. The pipeline detection system of claim 1, wherein the processing unit is configured to:
- calculate a path of the acoustic waves reflected by the pipeline through the body of water and the bed of the body of water based on the emitted reception signals, and
- calculate the parameter related to the position of the pipeline based on the calculated path of the acoustic waves.

4. The pipeline detection system of claim 1, wherein each acoustic wave source of said quantity of acoustic wave sources is configured to transmit the acoustic wave with a frequency linearly variable with time within a designated frequency range which depends on a desired space resolution and on a desired penetration depth.

5. The pipeline detection system of claim 1, wherein the quantity of acoustic wave sources is three, one of the three acoustic wave sources is located at the center of the support and the other two acoustic wave sources are located at respective ends of the support.

6. The pipeline detection system of claim 5, wherein at least one acoustic wave receiver is located between two of the acoustic wave sources.

7. The pipeline detection system of claim 1, wherein each acoustic wave receiver has a transduction gain from a sound to the reception signal that is substantially independent of the direction of provenance of the sound.

8. The pipeline detection system of claim 1, wherein the quantity of acoustic wave receivers is at least ten and the acoustic wave receivers are uniformly distributed along the support at a constant distribution distance of less than or equal to forty centimeters.

9. The pipeline detection system of claim 8, wherein the constant distribution distance is less than or equal to twenty centimeters.

10. The pipeline detection system of claim 1, wherein the acoustic wave receivers are distributed along the support over a designated length that ranges from three to five meters.

11. The pipeline detection system of claim 10, wherein the designated length is four meters.

12. The pipeline detection system of claim 1, wherein the support extends along an axis that is transverse to the moving direction and the quantity of acoustic wave sources and the quantity of acoustic wave receivers are distributed along the axis.

13. The pipeline detection system of claim 12, wherein the quantity of acoustic wave sources is at least two.

14. The pipeline detection system of claim 1, wherein the quantity of acoustic wave sources and the quantity of acoustic wave receivers are placed to form an upside-down V with a concave part facing the bed of the body of water.

15. The pipeline detection system of claim 14, wherein the quantity of acoustic wave sources is at least two.

16. The pipeline detection system of claim 1, wherein the processing unit is configured to calculate a speed of sound through the bed of the body of water from the emitted reception signals.

17. The pipeline detection system of claim 1, wherein the processing unit is connected to the quantity of acoustic wave sources to control transmission signals that define the transmitted acoustic waves and is configured to calculate the parameter related to the position of the pipeline based on the transmission signals.

18. The pipeline detection system of claim 17, wherein the parameter related to the position of the pipeline is calculated based on at least one of: a correlation between the transmission signals and the reception signals, and the transmission signals used as trigger signals during an acquisition of the reception signals.

19. The pipeline detection system of claim 1, wherein the processing unit is configured to calculate the parameter related to the position of the pipeline based on a semblance functional of the emitted reception signals.

20. The pipeline detection system of claim 1, wherein the parameter related to the position of the pipeline is a trenching height and the processing unit is configured to calculate the position of the pipeline, and the parameter based on the position of the pipeline and the expected bathymetric profile of the bed of the body of water.

21. The pipeline detection system of claim 1, wherein the processing unit is configured to calculate a value of a straightness of the pipeline based on at least one of: a value of the parameter related to the position of the pipeline in the bed of the body of water, and the position of the pipeline.

22. The pipeline detection system of claim 1, wherein the route is predetermined.

23. A detection method to check a position of a pipeline in a bed of a body of water extending along a route, the method comprising:
- immersing a quantity of acoustic wave sources and a quantity of at least three acoustic wave receivers to be at a designated estimated distance from the pipeline;
- moving, in a moving direction and along the route in the body of water, the quantity of acoustic wave sources and the quantity of at least three acoustic wave receivers distributed transversely to the moving direction;
- transmitting acoustic waves through the body of water and the bed of the body of water by the quantity of acoustic wave sources;
- receiving the transmitted acoustic waves reflected by the pipeline by the quantity of acoustic wave receivers;
- acquiring at least one datum selected from the group consisting of: a known value of a cross-section of the pipeline, an expected value of the position of the pipeline, a shape of the pipeline, a bathymetric profile of the bed of the body of water, and an expected value of the position of the pipeline;
- calculating a parameter related to the position of the pipeline in the bed of the body of water based on the reflected acoustic waves received and the at least one datum; and
- checking if the calculated parameter related to the position of the pipeline in the bed of the body of water falls within a designated range of parameters related to the position of the pipeline in the bed of the body of water.

24. The method of claim 23, further comprising changing the moving direction based on a previously calculated parameter.

25. The method of claim 23, further comprising:
calculating a path of the acoustic waves reflected by the pipeline through the body of water and the bed of the body of water based on the received acoustic waves; and
calculating the parameter related to the position of the pipeline based on the calculated path of the acoustic waves.

26. The method of claim 23, wherein the quantity of acoustic wave sources and the quantity of acoustic wave receivers are distributed along an axis over a length, and further comprising defining the designated estimated distance from the pipeline within the range having extremes resulting from: a) the length and b) twice the length.

27. The method of claim 26, wherein the designated estimated distance is equal to a product of one and a half times the length.

28. The method of claim 23, further comprising emitting acoustic waves with a frequency linearly variable with time within a designated frequency range which depends on the desired space resolution and on the desired penetration depth.

29. The method of claim 23, further comprising calculating a speed of sound in the bed of the body of water based on the received acoustic waves.

30. The method of claim 23, further comprising controlling the transmitted acoustic waves and calculating the parameter related to the position of the pipeline in the bed of the body of water based on the transmitted acoustic waves.

31. The method of claim 30, further comprising at least one of: carrying out a correlation between transmission signals concerning the transmitted acoustic waves and reception signals concerning the received acoustic waves, and using transmission signals concerning the transmitted acoustic waves as trigger signals during an acquisition of the reception signals concerning the received acoustic waves.

32. The method of claim 23, further comprising calculating the parameter related to the position of the pipeline based on a semblance functional of the reception signals concerning the received acoustic waves.

33. The method of claim 23, wherein the parameter is a trenching height and further comprising calculating the position of the pipeline and calculating the parameter based on the position of the pipeline and the bathymetric profile of the bed of the body of water.

34. The method of claim 23, further comprising calculating a value of a straightness of the pipeline based on one of: the parameter and the position of the pipeline.

35. The method of claim 23, wherein the route is predetermined.

* * * * *